(12) United States Patent
Nyckowski et al.

(10) Patent No.: US 9,686,919 B2
(45) Date of Patent: Jun. 27, 2017

(54) METHOD FOR CONTAINING A BALE OF COMPRESSIBLE MATERIAL WITHOUT STRAPS

(71) Applicant: Premark Packaging LLC, Glenview, IL (US)

(72) Inventors: Andrew J. Nyckowski, Palatine, IL (US); Timothy B. Pearson, Antioch, IL (US)

(73) Assignee: SIGNODE INDUSTRIAL GROUP LLC, Glenview, IL (US)

( * ) Notice: Subject to any disclaimer, the term of this patent is extended or adjusted under 35 U.S.C. 154(b) by 272 days.

(21) Appl. No.: 14/182,136

(22) Filed: Feb. 17, 2014

(65) Prior Publication Data

US 2014/0158560 A1  Jun. 12, 2014

Related U.S. Application Data

(63) Continuation-in-part of application No. 13/840,601, filed on Mar. 15, 2013.

(Continued)

(51) Int. Cl.
*A01F 25/13* (2006.01)
*B65B 13/20* (2006.01)
(Continued)

(52) U.S. Cl.
CPC ............ *A01F 25/13* (2013.01); *B30B 9/3014* (2013.01); *B30B 15/32* (2013.01); *B65B 27/125* (2013.01); *B65B 63/02* (2013.01); *B65B 63/022* (2013.01)

(58) Field of Classification Search
CPC ......... B65B 13/20; B65B 63/13; B65B 63/02; B65B 27/125; A01F 25/13; B30B 9/3014; B30B 15/32

USPC ....................................................... 206/83.5
See application file for complete search history.

(56) References Cited

U.S. PATENT DOCUMENTS

| | | |
|---|---|---|
| 3,968,619 A | 7/1976 | Fishburne |
| 4,162,603 A | 7/1979 | Stromberg |
| (Continued) | | |

FOREIGN PATENT DOCUMENTS

| | | |
|---|---|---|
| AU | 4851768 A | 7/1971 |
| AU | 310432 | 10/2006 |
| (Continued) | | |

OTHER PUBLICATIONS

International Search Report for PCT/US2015/012900, dated Mar. 23, 2015.

(Continued)

*Primary Examiner* — Robert Long
*Assistant Examiner* — Xavier A Madison
(74) *Attorney, Agent, or Firm* — Levenfeld Pearlstein, LLC

(57) ABSTRACT

A method for containing a bale of compressible material includes compressing the bale of compressible material to form a compressed bale having a plurality of grooves in at least one side thereof. The grooves are recessed from an outer surface of the compressed bale. The compressed bale is transferred to a flexible container. The container conforms to a shape of the compressed bale such that at least some portions of the flexible container take the shape of the grooves to define container portions recessed from the outer surface of the compressed bale. A containerized bale made by the method is also disclosed.

22 Claims, 13 Drawing Sheets

Related U.S. Application Data

(60) Provisional application No. 61/716,958, filed on Oct. 22, 2012, provisional application No. 61/647,823, filed on May 16, 2012.

(51) Int. Cl.

| | | |
|---|---|---|
| *B65B 63/02* | (2006.01) | |
| *B30B 9/30* | (2006.01) | |
| *B30B 15/32* | (2006.01) | |
| *B65B 27/12* | (2006.01) | |

(56) References Cited

U.S. PATENT DOCUMENTS

| | | |
|---|---|---|
| 5,694,742 A | 12/1997 | Elliott et al. |
| 5,743,374 A | 4/1998 | Monsees |
| 5,890,426 A | 4/1999 | Gumkowski |
| 7,013,625 B2 | 3/2006 | Curles |
| 7,389,723 B1 | 6/2008 | Bullington |
| 7,421,944 B1 | 9/2008 | Flaum et al. |
| 7,958,699 B2 | 6/2011 | Honegger |
| 7,987,651 B2 | 8/2011 | Beeland |
| 2005/0284775 A1 | 12/2005 | McLaughlin |
| 2011/0094396 A1 | 4/2011 | Borrelli et al. |
| 2013/0305662 A1 | 11/2013 | Nyckowski |
| 2014/0041339 A1 | 2/2014 | Borrelli |

FOREIGN PATENT DOCUMENTS

| | | |
|---|---|---|
| CN | 1527778 A | 9/2004 |
| CN | 2764602 Y | 3/2006 |
| CN | 1290745 C | 12/2006 |
| DE | 3009016 A1 | 9/1981 |
| EP | 0198992 A1 | 10/1986 |
| EP | 0928555 A1 | 7/1999 |
| WO | 9420366 A1 | 9/1994 |
| WO | 2006115973 A1 | 11/2006 |
| WO | 2007028558 A1 | 3/2007 |
| WO | 2008040090 A1 | 4/2008 |
| WO | 2009115314 A1 | 9/2009 |

OTHER PUBLICATIONS

International Search Report for PCT/US2013/041289, dated Aug. 14, 2013.

Examination Report for AU 201326744 dated Sep. 15, 2015.

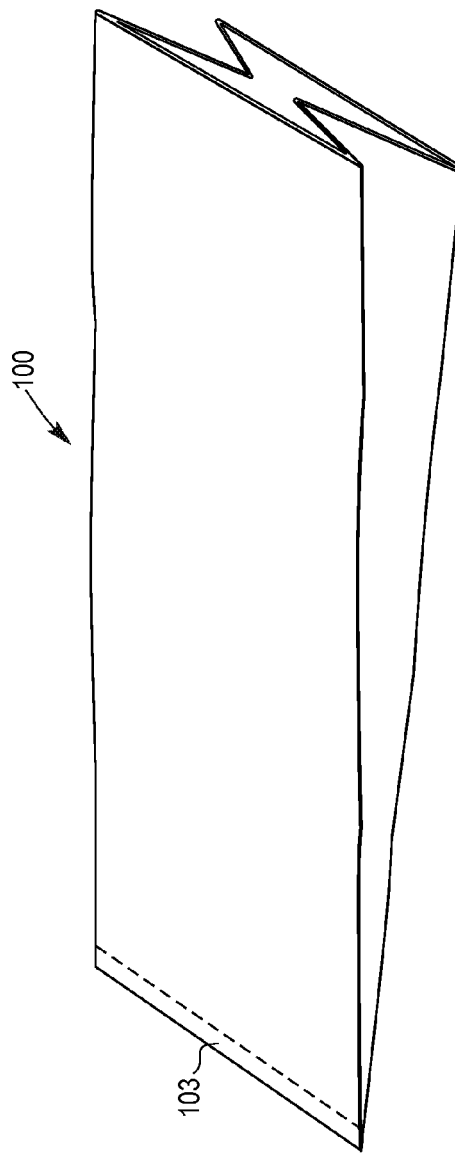
FIG. 15
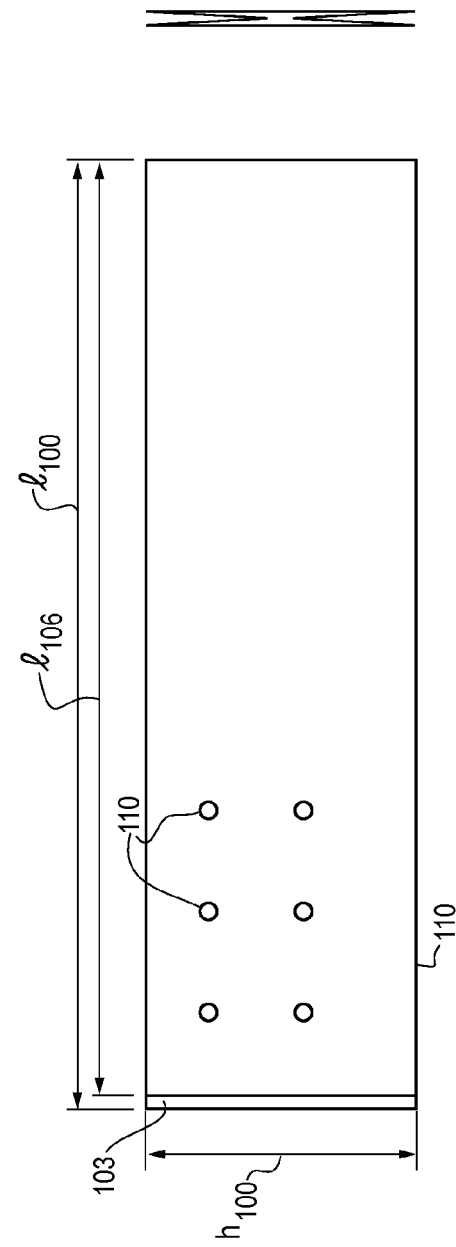
FIG. 16
FIG. 17

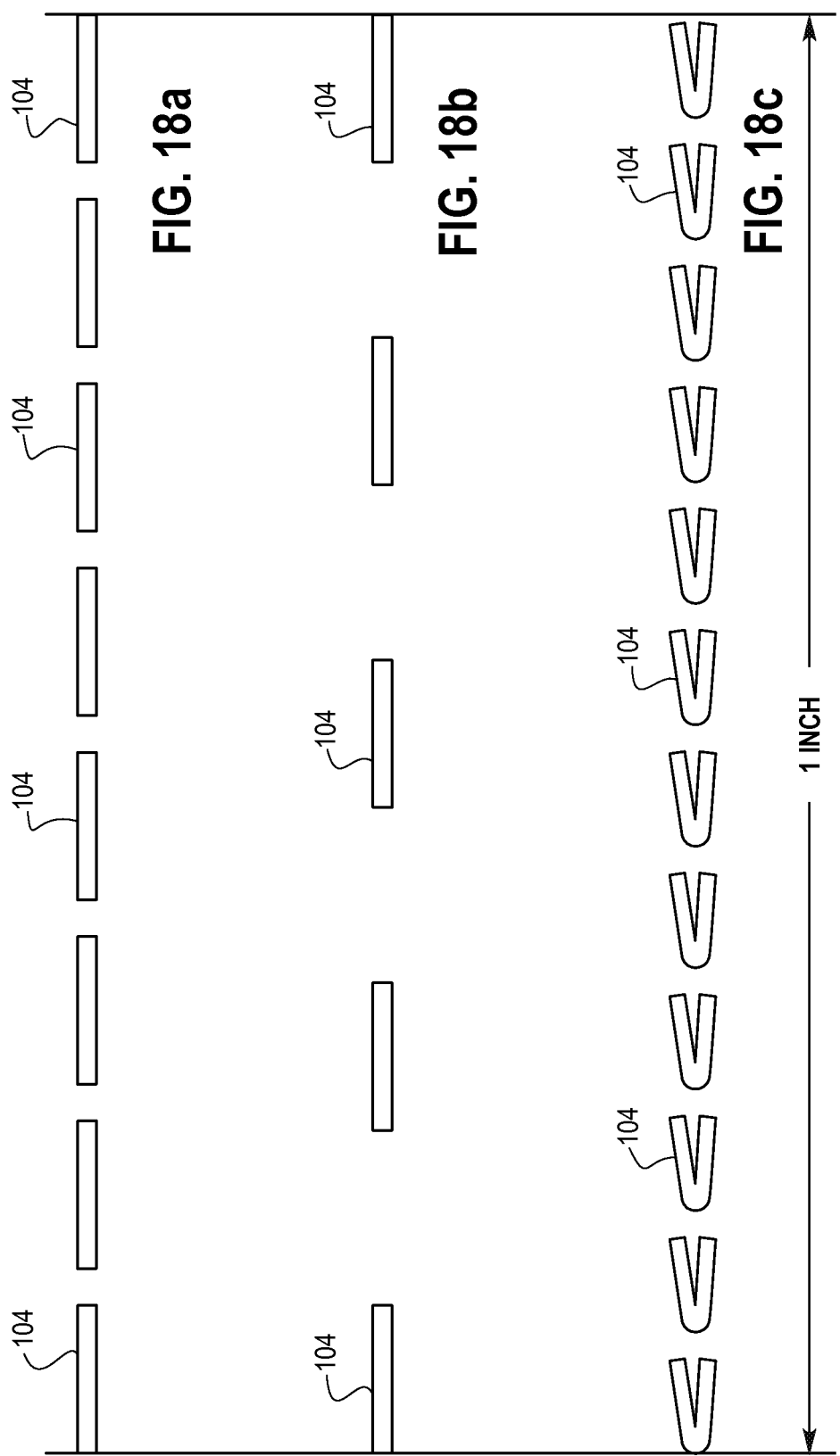

METHOD FOR CONTAINING A BALE OF COMPRESSIBLE MATERIAL WITHOUT STRAPS

CROSS-REFERENCE TO RELATED APPLICATION DATA

This application is a continuation-in-part of U.S. patent application Ser. No. 13/840,601, filed Mar. 15, 2013, which application claims the benefit of and priority to Provisional U.S. Patent Application Ser. Nos. 61/716,958, filed Oct. 22, 2012 and 61/647,823, filed May 16, 2012, the disclosures of which are incorporated herein in their entireties.

BACKGROUND

Large quantities of low density fibrous materials such as cotton and the like are often bundled or baled for handling and storage. In a typical process, cotton is cleaned to separate the cotton fibers from sticks and other debris, and the cotton fibers are separated from the seed in a gin. The cotton (referred to as lint) is transported to a press or baler where it is compressed into a high density bundle or bale. Following compaction, the bale is secured to facilitate handling. The bale can be secured by multiple straps or wires to maintain the bale configuration and stability. One industry standard is to band the bale with eight (8) wires or straps around the shorter periphery of the bale.

Typically, the bale is then sampled and classed into a standard cotton class to identify the quality of the cotton. The bale is then wrapped for protection, for example, in a wrap or bag, to protect the cotton from exposure to the environs, dirt, debris or factors that can affect the cotton quality. Wrapping or bag materials include polyethylene, polypropylene, cotton and the like. The wrapped bale can then be transported for subsequent processing.

While the wrapping or bagging can help to prevent damage to the bale, the wrapping or bagging material itself can be damaged. For example, at ginning facilities, cotton bales are often stored two layers high, which can put a significant amount of strain on the bales, particularly the bottom bale. Also, the cotton bales stored in certain facilities have to be rearranged or moved from time to time, such as while being loaded onto a truck for delivery. Moreover, the configuration of cotton bales being stored in a warehouse or other storage facility has to be changed from time to time in order to optimize warehouse space. During this stacking and moving, and loading and unloading of the bales described above, the bales are frequently being pushed on an abrasive surface (e.g., concrete or asphalt flooring of a warehouse or storage facility) causing straps to break and bags or wrapping material to rupture.

There is therefore a need for an improved system for baling a highly compressible material, such as cotton, in a manner that can contain the pressure of the highly compressed material, that maintains the integrity of the bale and the bale in a compressed state, and that protects the bale as well as any protective wrapping or bag applied to the bale from damage.

SUMMARY

Various embodiments of the present disclosure provide a method, system, and/or device for containing a bale of compressible material without the use of straps or wires. In an embodiment, a method according to the present disclosure includes compressing a quantity of compressible material into a bale and introducing the bale into a bag. The bale is compressed in such a manner that channels or grooves are formed in at least one side of the bale. As described in further detail below, the bag conforms to the shape of the compressed bale, such that when the bale is introduced into and allowed to expand within the bag, the regions or zones of the bag that conform to the channels or grooves are recessed below the outermost face or surface of the bag.

In an embodiment, the bale is compressed in a press having an upper plate and a lower platen, wherein the upper plate and lower platen are configured to compress the bale of compressible material therebetween. One or more or both of the upper plate and lower platen of the press has a series of channels formed therein. In various embodiments, the channels may be spaced apart at designated distances from each other. The upper plate and lower platen can thus form recesses or grooves in the surfaces of the bale when the bale is compressed by the press. After the bale is compressed by the press, the bale is conveyed from the press to a bagging area or device (referred to herein as a bagger) such as by a conveyor, as discussed in more detail in the example below, where the bale is introduced into a bag. It should be appreciated that the bale is not contained by straps or wires when it is introduced into the bag. Rather, the bag is made of a flexible and sufficiently strong material to contain the compressed bale without the use of straps or wires. In various embodiments, the bag is a woven bag that is woven from a high strength material, such as but not limited to polyethylene terephthalate (PET), polypropylene, polyethylene, and like materials. In an embodiment, the bag may be made by weaving or looming multiple strips or tapes of the polymeric material into a fabric that is used to make the bag. When the bale is introduced into the bag, the bale expands against the bag, and the bag conforms to the shape of the bale. As such, the regions of the bag that overlie the recesses or grooves conform to the shape of the recesses or grooves. When this occurs, the regions of the bag that overlie the recesses or grooves become recessed below the face of the bag after the bale has expanded into the bag. In this manner, any face or side of the bagged bale that is facing or resting on the ground (or floor) has portions that do not make contact with the ground. Therefore, even if the parts of the bag that contact the ground are damaged (such as when the bale is moved around the floor of a warehouse, or loaded and unloaded from a truck and the face of the bag is abraded), the recessed portions may remain intact. In other words, the recessed portions of the bag facilitate maintaining the integrity of the bale even if the facial portions of the bag are damaged, such as by abrasion.

In an embodiment, a containerized bale of compressible material secured without straps or wires is formed by compressing the bale of compressible material to form a compressed bale having a plurality of grooves in at least one side thereof. The grooves are recessed from an outer surface of the compressed bale. The compressed bale is transferred to a flexible container such that at least some of the grooves are maintained therein. The container conforms to a shape of the compressed bale such that at least some portions of the flexible container conform to the grooves to define container portions recessed from the outer surface of the compressed bale.

The grooves can be formed in two sides of the compressed bale and the two sides can be opposite one another and can be aligned with one another, wherein the portions of the container conforming to the grooves surround the bale at a least possible distance around the bale. The grooves in the compressed bale can be equally spaced apart from one another or they can be at varying distances from one another along the length of the bale.

The flexible container can be a bag and can be formed from a woven material, such as a woven polymeric material, for example, a woven PET material.

These and other features and advantages of the present method, system and device will be apparent from the following detailed description, in conjunction with the appended claims.

BRIEF DESCRIPTION OF THE DRAWINGS

FIG. 15 is a perspective view of an example bag for containing a compressed bale of material in accordance with an embodiment of the system of the present disclosure, where the bag is shown in a folded state;

FIG. 16 is a front view of the example bag;

FIG. 17 is a side view of the example bag in a folded state;

FIGS. 18a-18c illustrate three different example bag weave densities;

DETAILED DESCRIPTION

Various embodiments of the present disclosure provide a method, system, and/or device for containing a bale of compressible material without the use of straps or wires.

One method for containing a bale of compressible material without straps or wires, includes compressing the bale of compressible material to form a compressed bale having a plurality of grooves in at least one side thereof. The grooves are recessed from an outer surface of the compressed bale. The method includes transferring the compressed bale to a flexible container. The compressed bale maintains at least some of the grooves therein and the container conforms to a shape of the compressed bale such that at least some portions of the flexible container conform to the grooves to define container portions recessed from the outer surface of the compressed bale.

The grooves can be formed in two sides of the compressed bale, and the two sides can be opposite one another such that the grooves in the opposite sides of the bale are aligned with one another, wherein the portions of the container conforming to the grooves surround the bale at a least possible distance. The grooves in the compressed bale can be formed equally spaced apart from one another or they can be formed at varying distances from one another along the length of the bale.

The flexible container can be a bag, and the bag can be formed from a woven material. The woven material can be a woven polymeric material, such as but not limited to a woven polyethylene terephthalate (PET), polypropylene, polyethylene or like materials and combinations thereof.

Another method for containing a bale of compressible material without straps or wires includes forming a grooved compressed bale of compressible material, in which the grooved compressed bale has grooves in at least one side thereof, and in which the grooves are recessed from an outer surface of the compressed bale. The method can include introducing the compressed bale into a flexible container such that at least a portion of the flexible container conforms to the grooves and is recessed from the outer surface of the compressed bale, and such that the grooves extend around the bale in a direction perpendicular to a longitudinal axis of the bale.

In a method, the grooves are formed in two opposite sides of the compressed bale aligned with one another relative to the longitudinal axis. The grooves can be formed in the compressed bale equally spaced apart from one another or they can be formed at varying distances from on another along the length of the bale.

Figure 1:
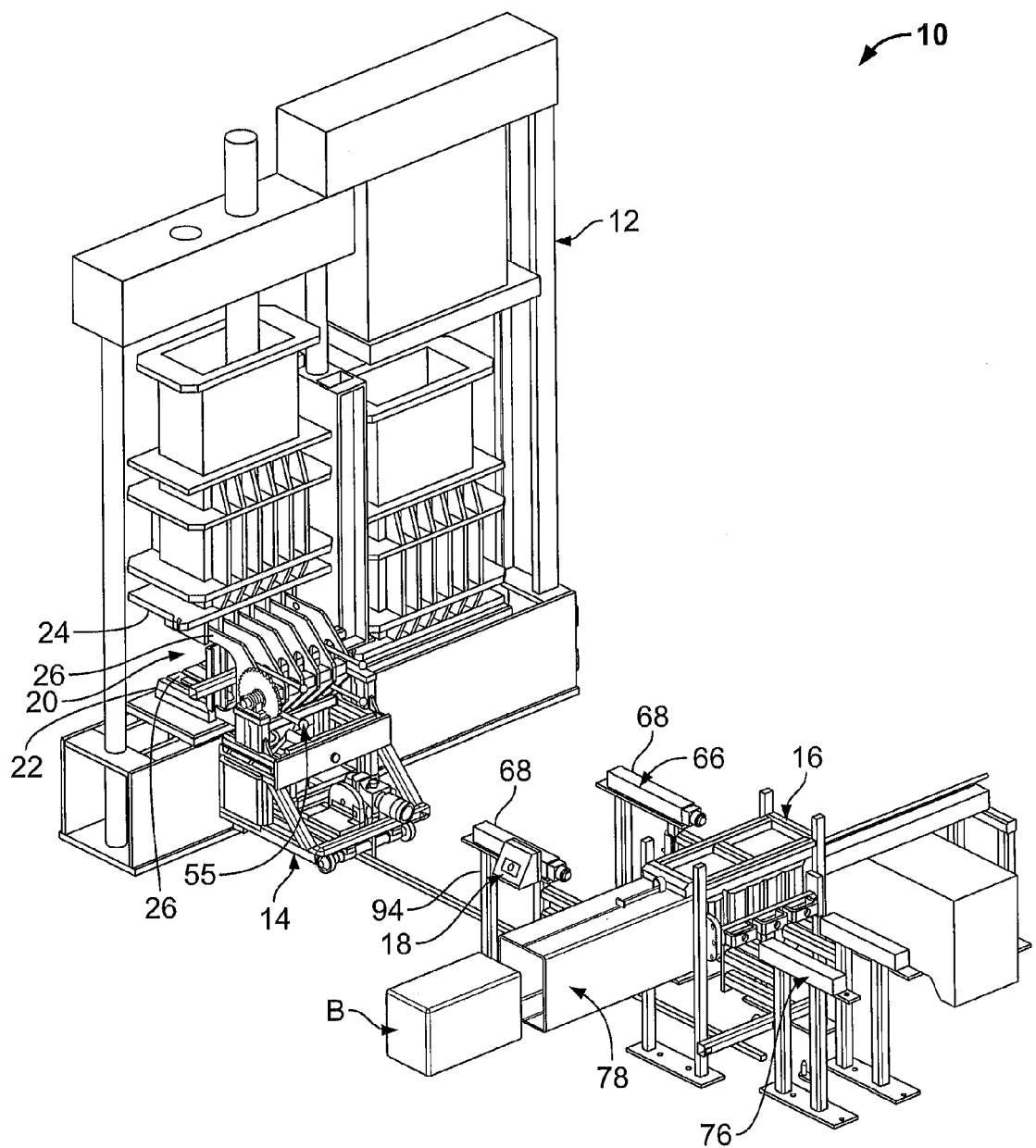
FIG. 1 is a perspective illustration of a compressible material press and a baler including an example embodiment of a system of the present disclosure.
Figure 2:
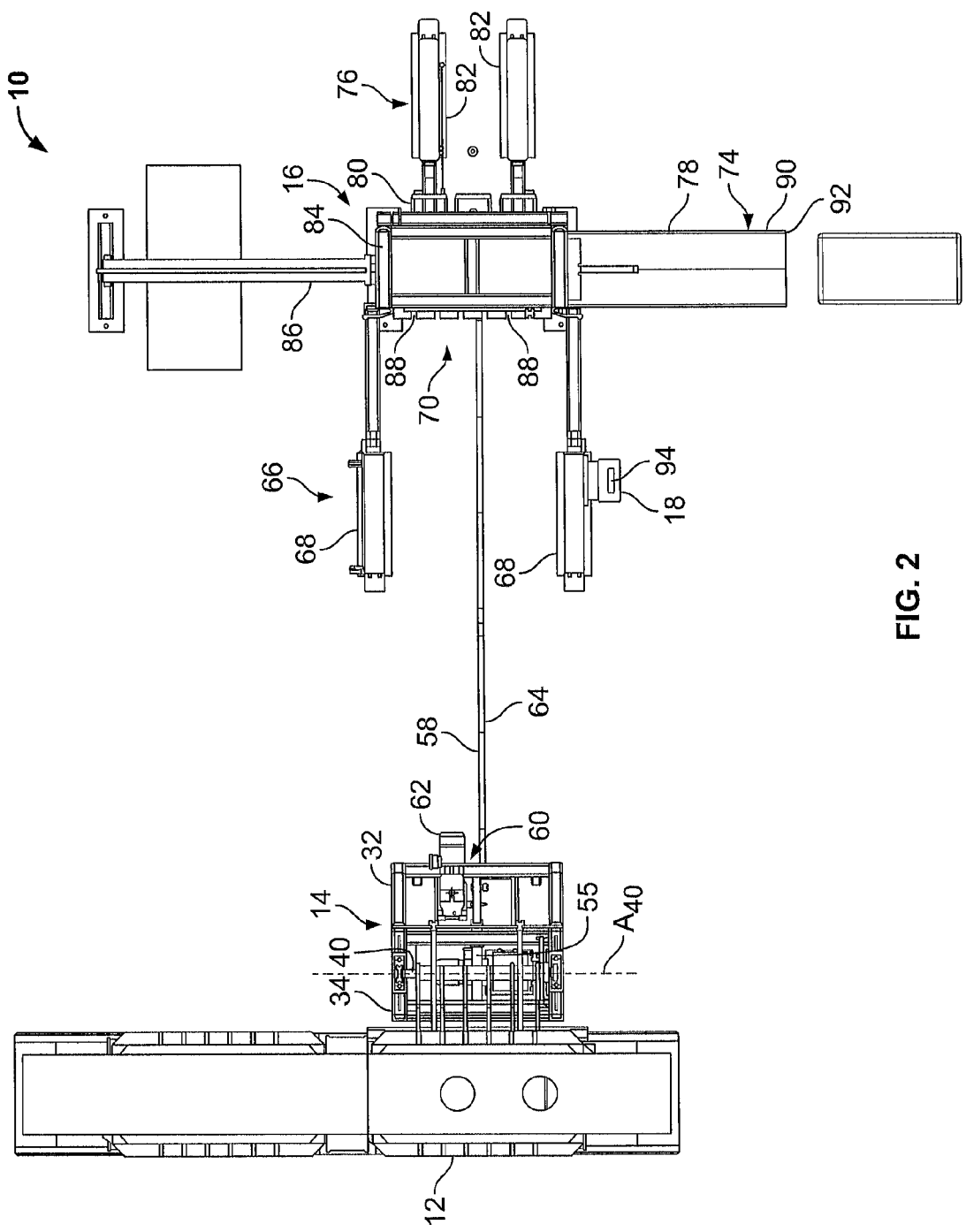
FIG. 2 is a top view of the baler and press of FIG. 1.
Figure 3:
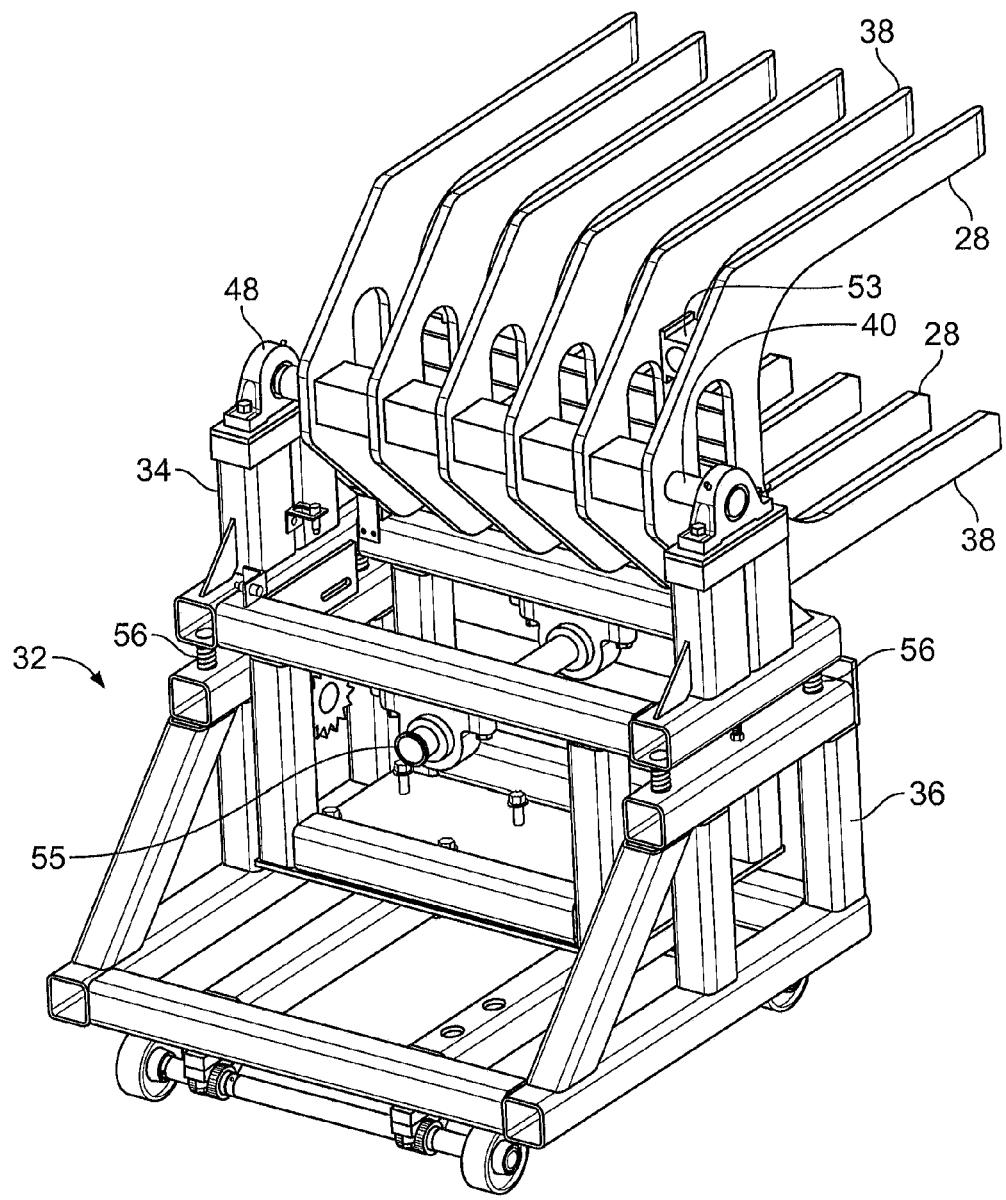
FIG. 3 is a perspective view of a conveyor load carriage and a mobile base of the illustrated example embodiment of the system of the present disclosure.
Figure 4:
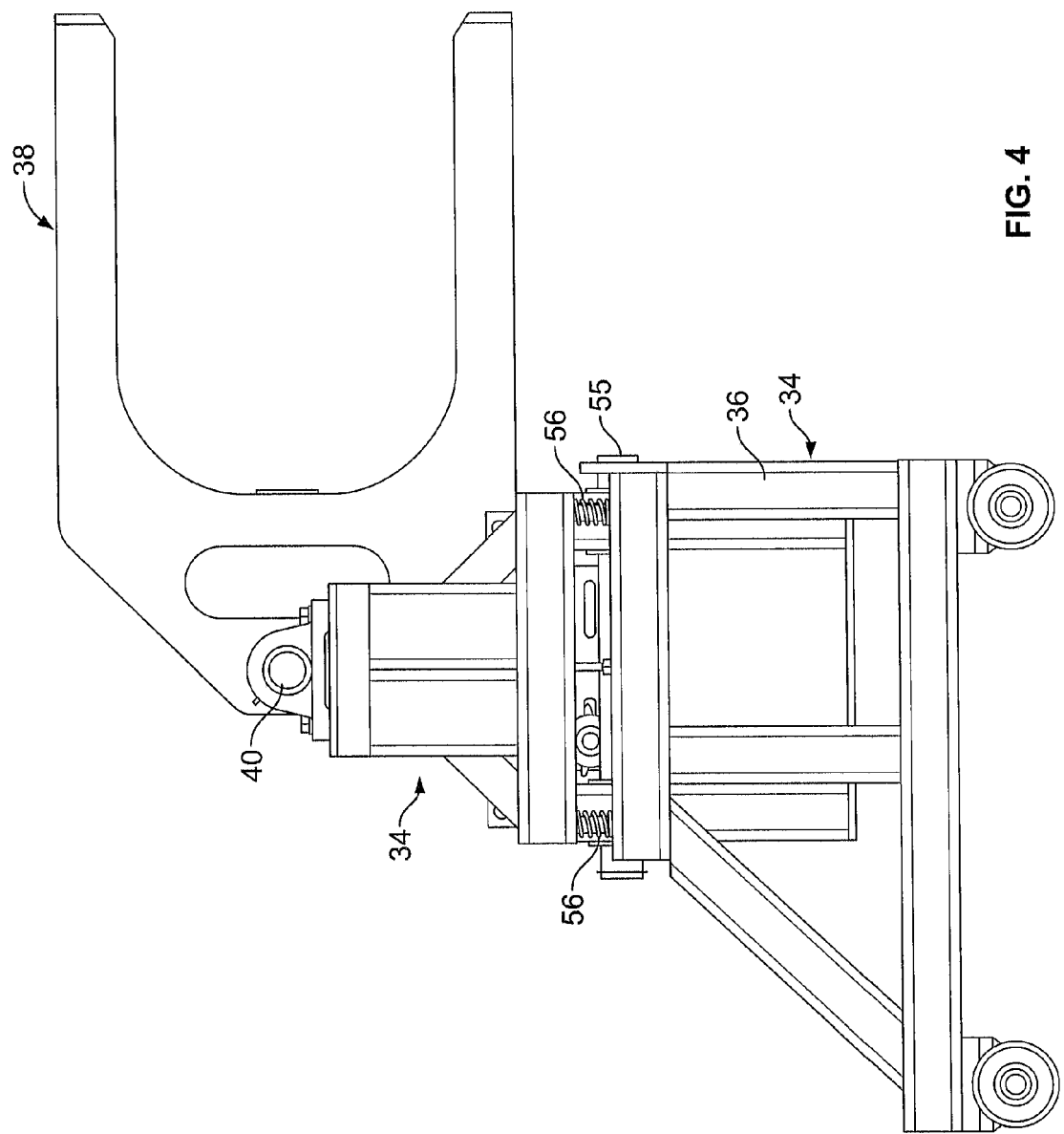
FIG. 4 is a front view of the conveyor load carriage and mobile base.
Figure 5:
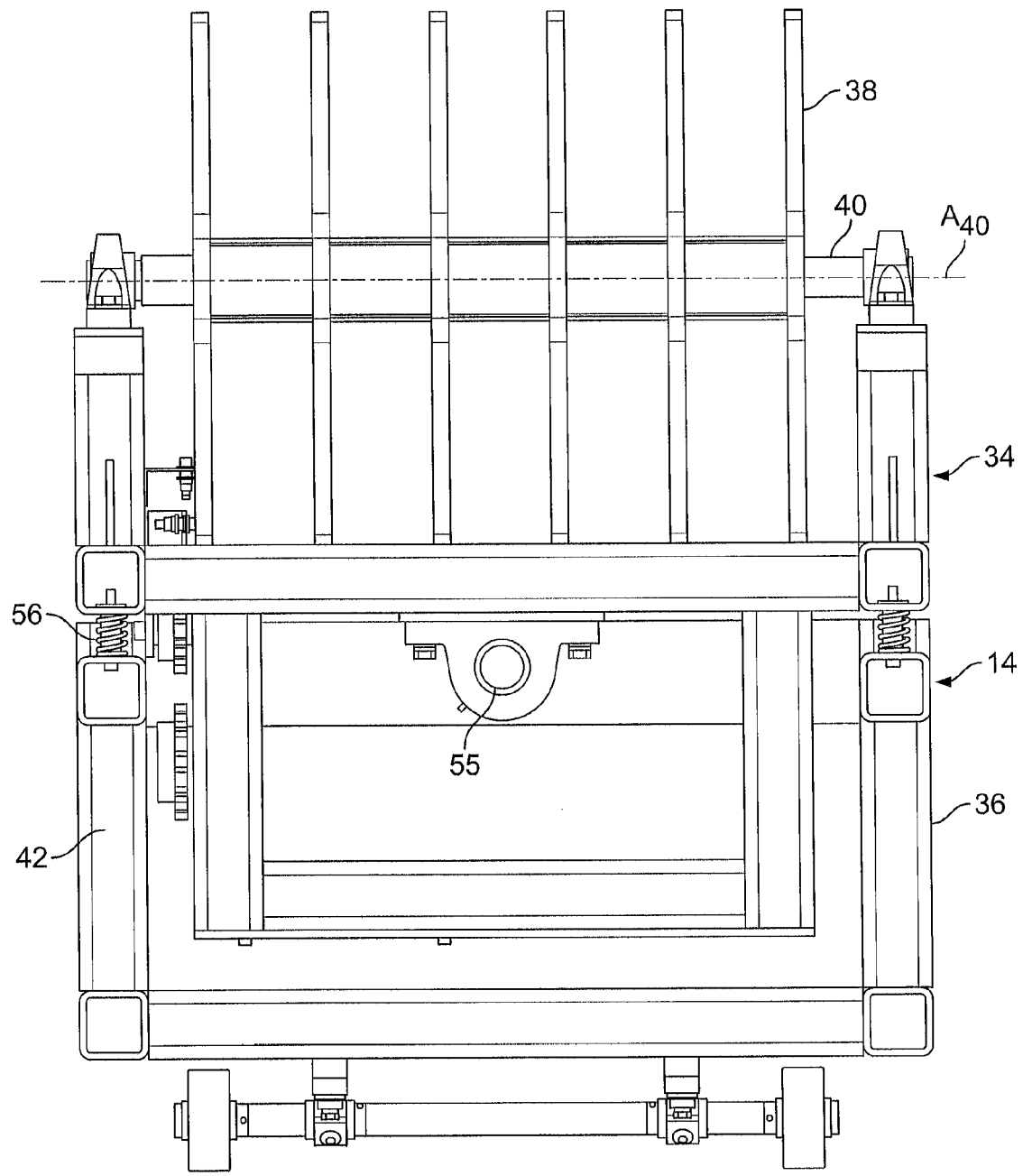
FIG. 5 is a side view of the conveyor load carriage and mobile base.
Figure 6:
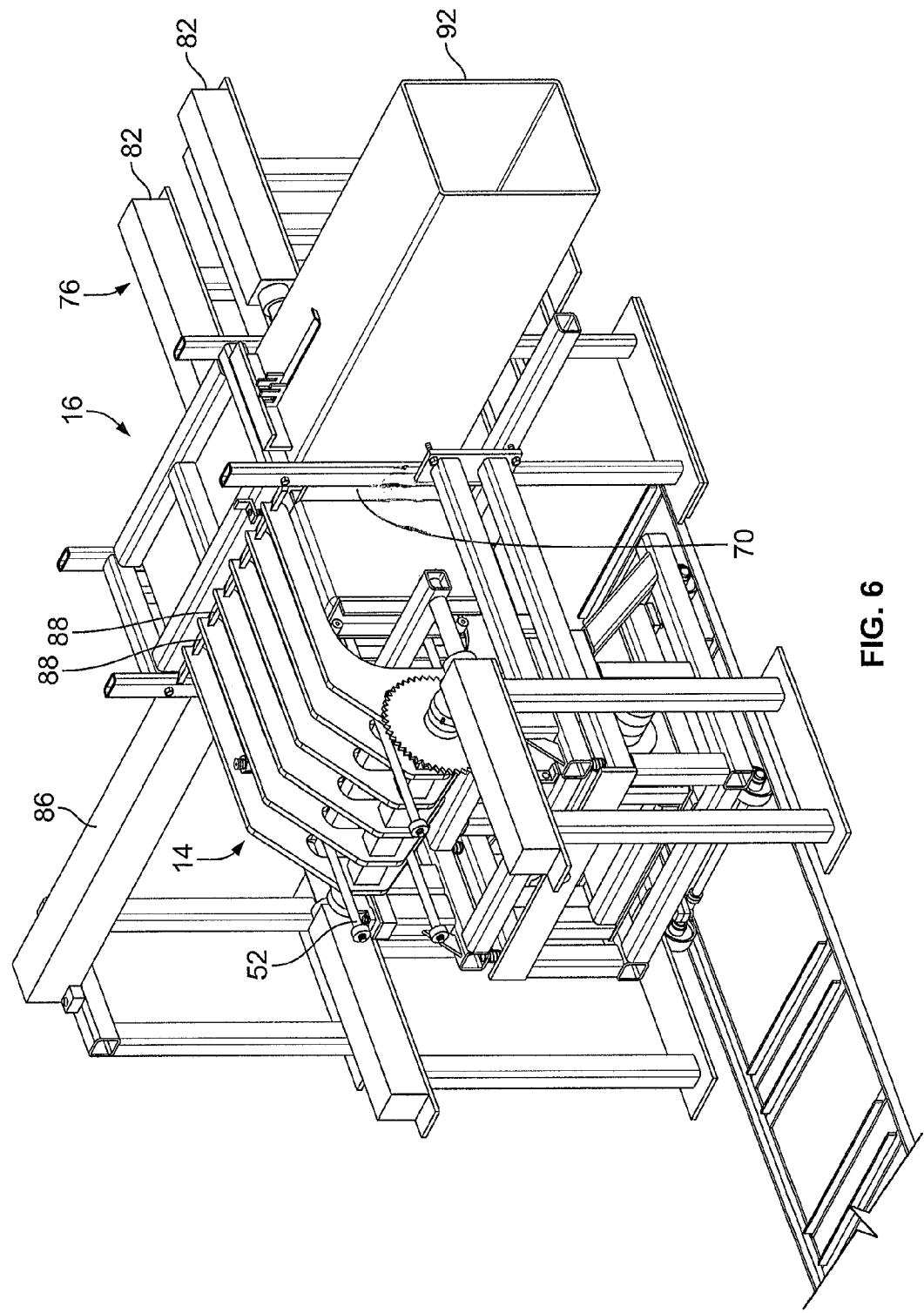
FIG. 6 is perspective view of the conveyor load carriage and mobile base in position to transfer a bale to a bagger.
Figure 8:
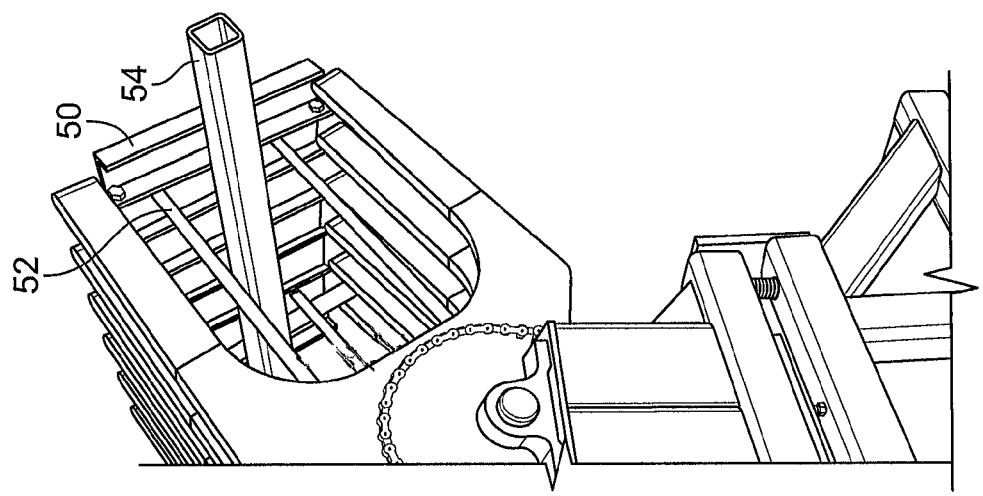
FIG. 8 illustrates the load carriage in a partially pivoted state with the transfer plate extended.
Figure 7:
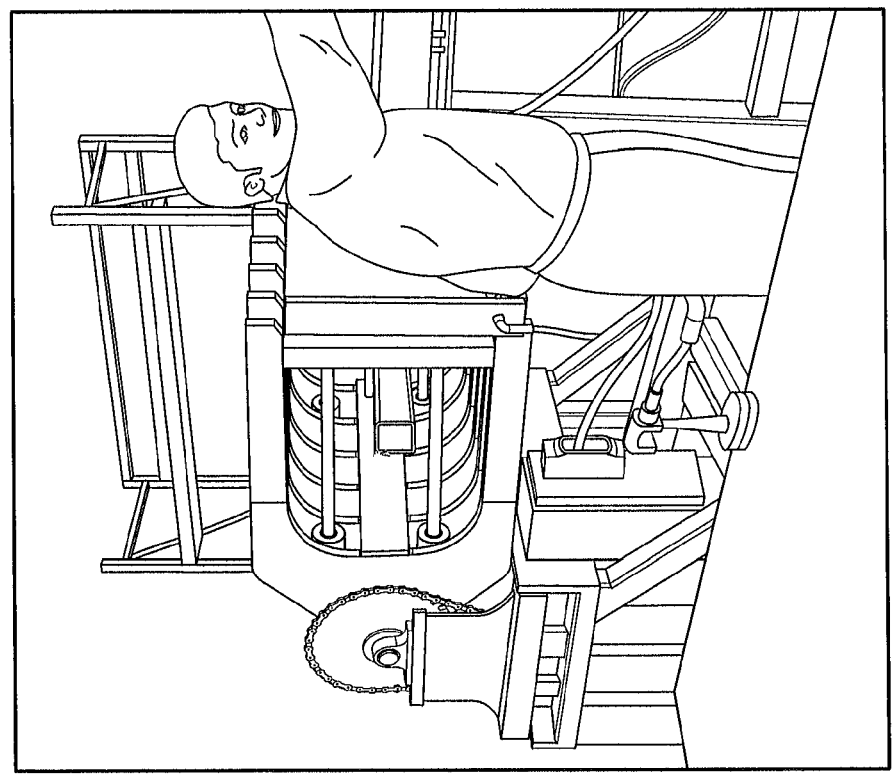
FIG. 7 illustrates the load carriage and base showing the transfer plate in an extended state.
Figure 10:
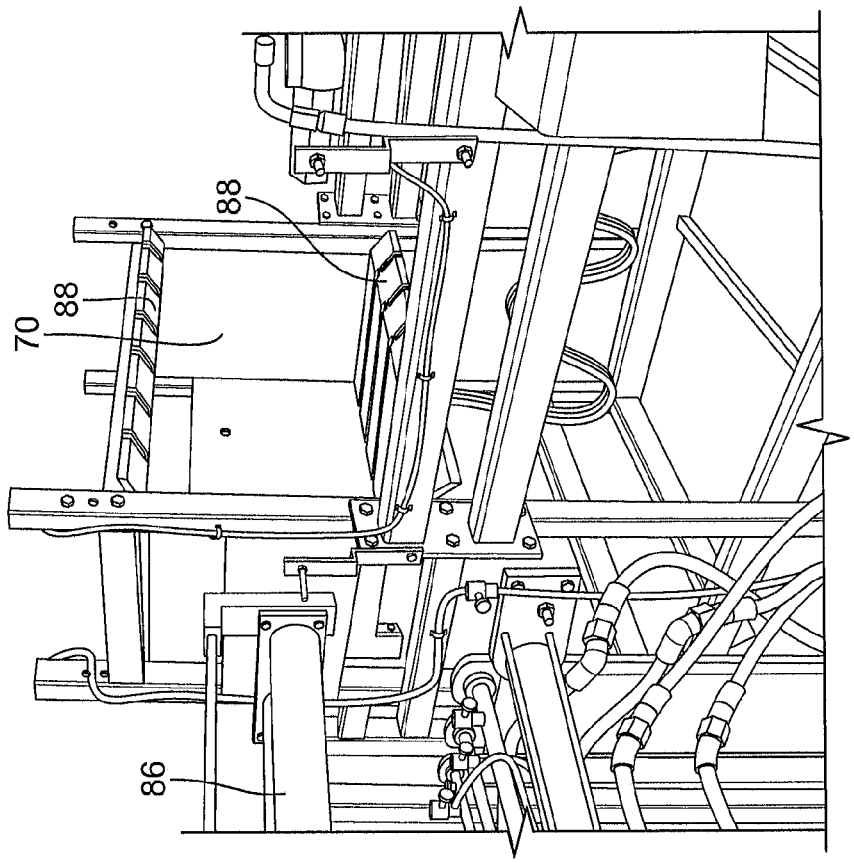
FIG. 10 is perspective illustration of the bagger entrance and showing, in partial view, the discharge drive.
Figure 9:
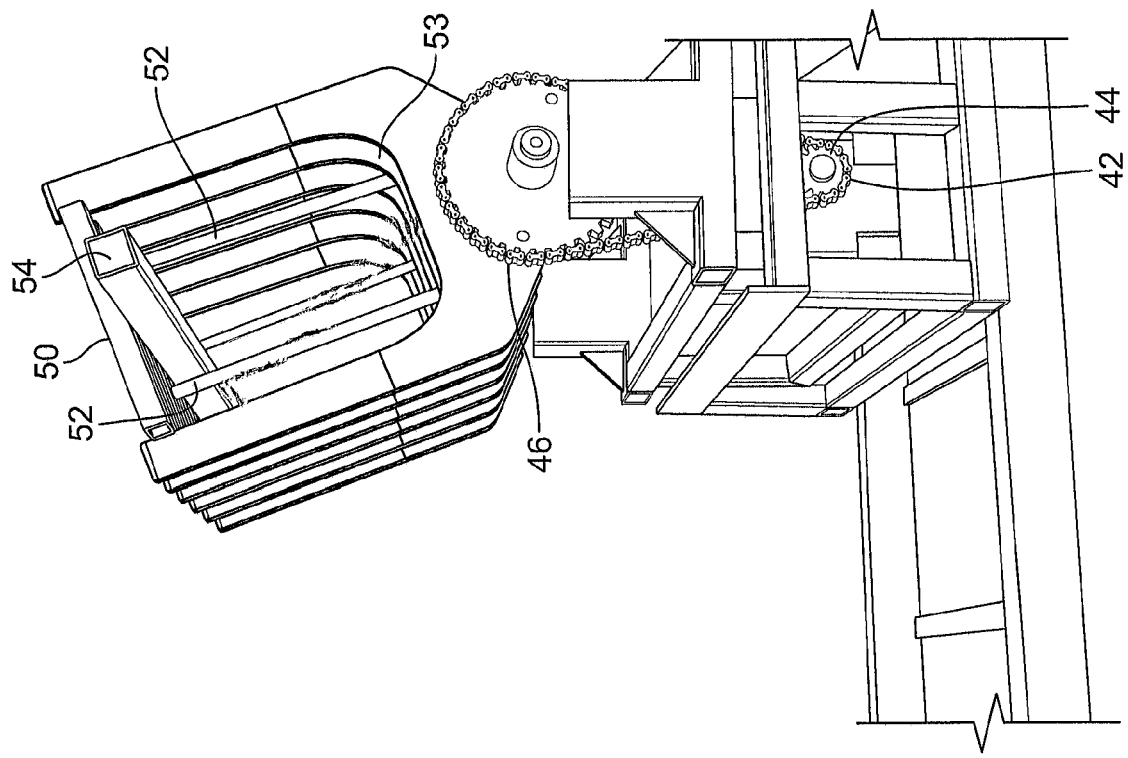
FIG. 9 is another illustration of the load carriage in a partially pivoted state.
Figure 12:
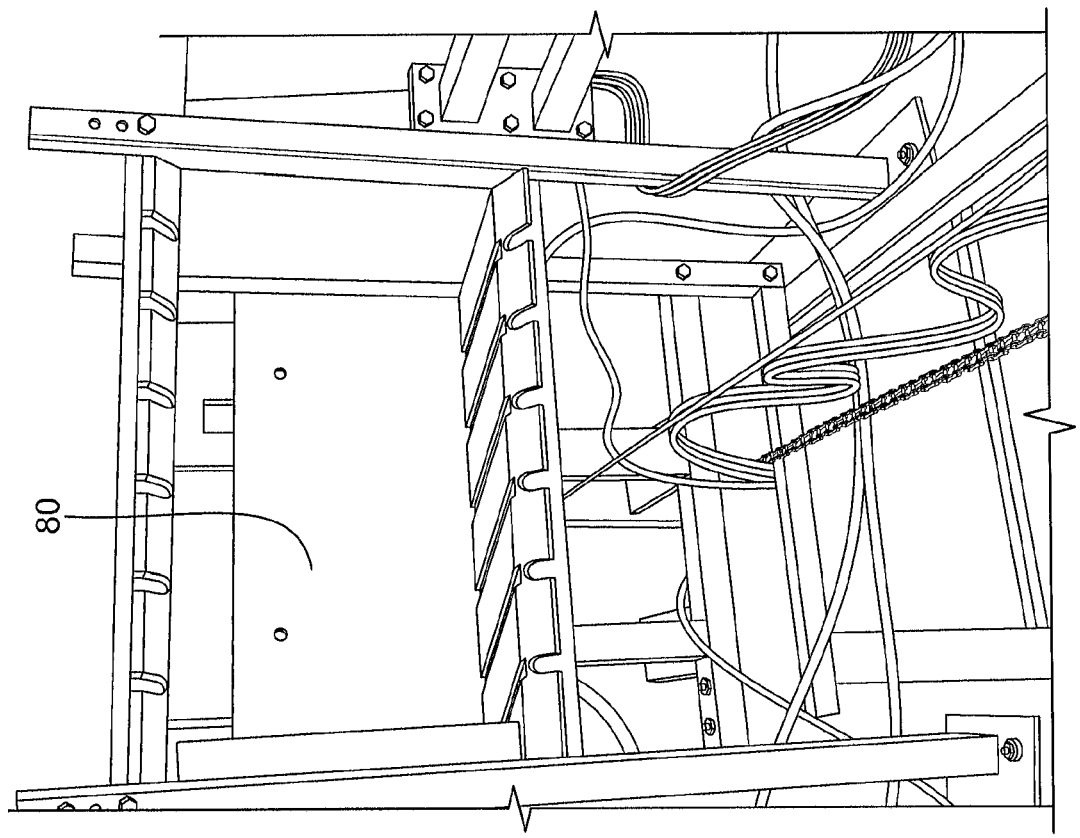
FIG. 12 is a view looking into the entrance of the bagger and showing the back-up plate.
Figure 11:
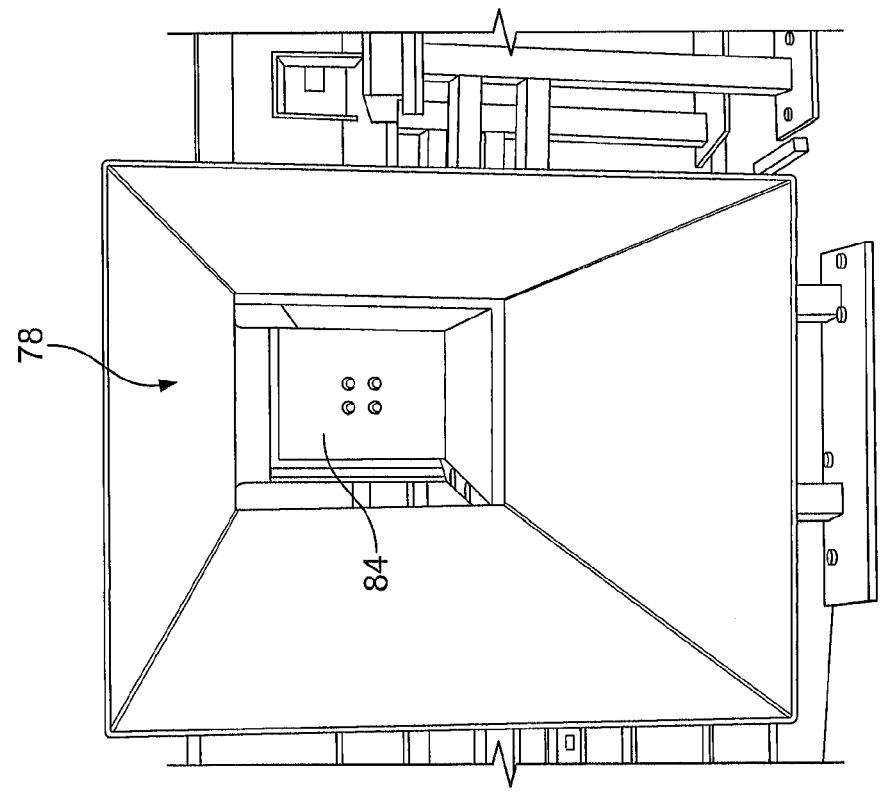
FIG. 11 is an illustration looking into the discharge end of the bagger and showing the discharge drive plate.
Figure 14:
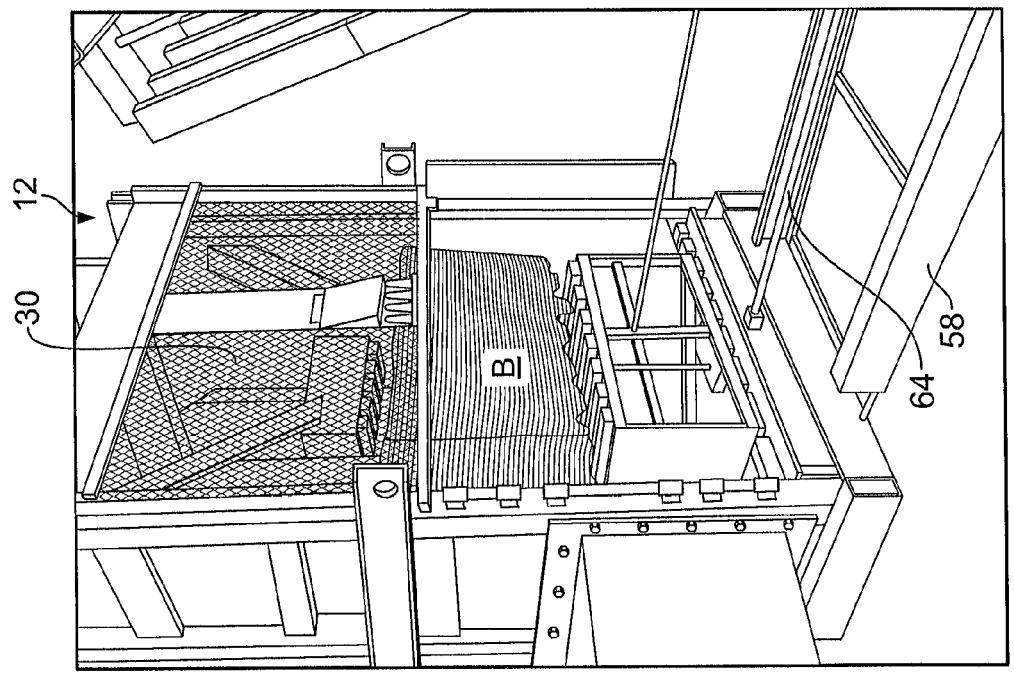
FIG. 14 is a perspective view of the bale press and a bale with the gate in an open position.
Figure 13:
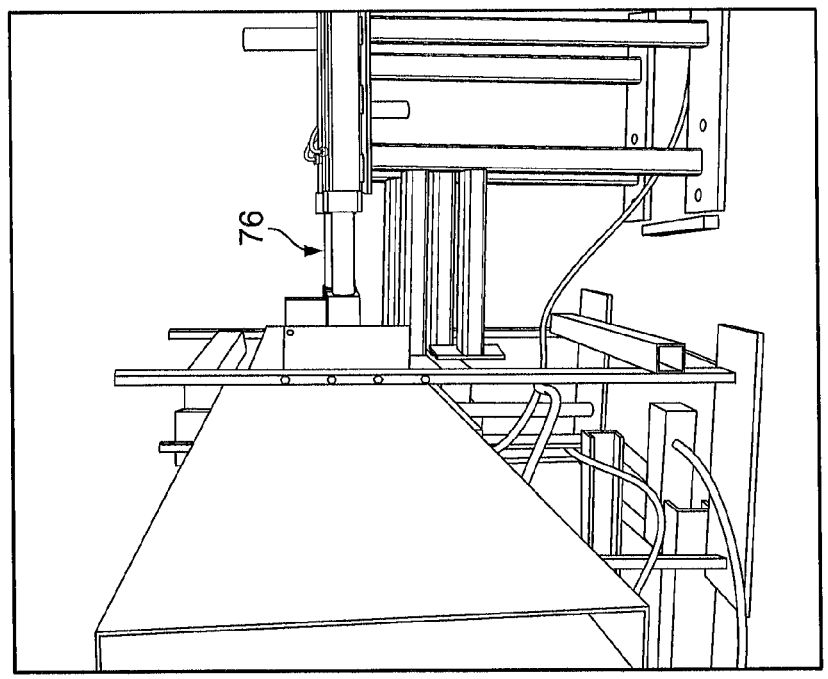
FIG. 13 is a side view of the bagger and the back-up cylinders.
Figure 21:
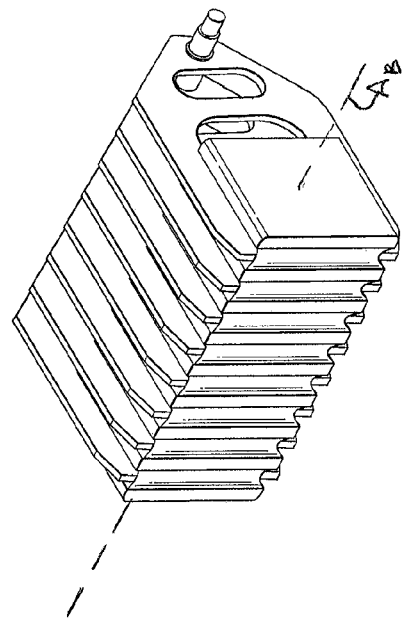
FIG. 21 is a perspective view of the compressed bale in the load carriage fork set.
Figure 20:
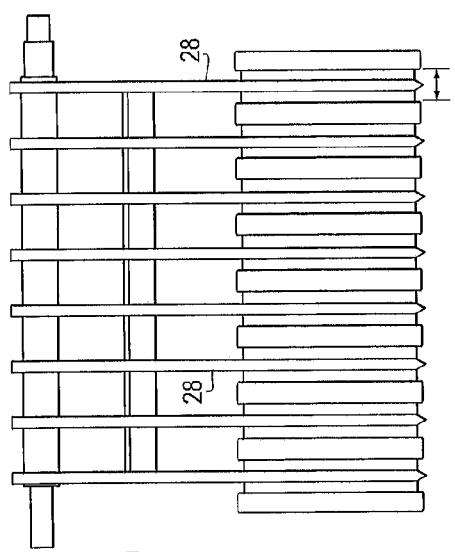
FIG. 20 is a top view of the bale in the load carriage as illustrated in FIG. 19.
Figure 19:
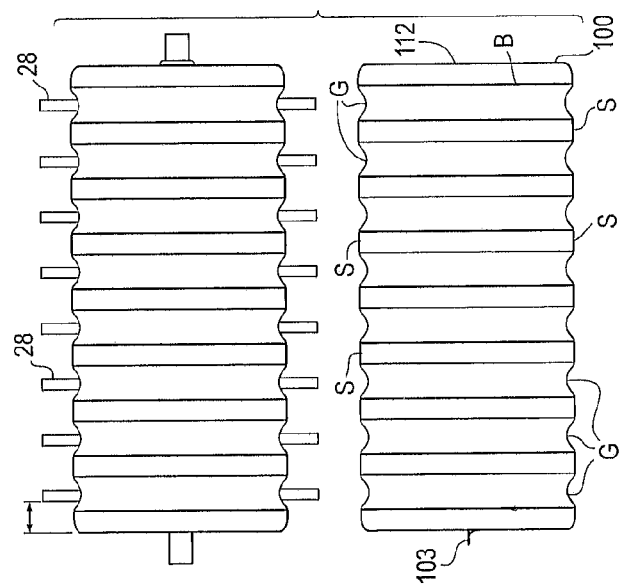
FIG. 19 is a front view of the example bag which shows the relationship of the compressed bale and the grooves or recesses formed in the bale from compression (and the load carriage fork set engaging the bale) and the bag as it conforms to the grooves in the bale.

Referring now to FIGS. 1 and 2, one example embodiment of a system for containing a bale B of compressible material according to the present disclosure includes a baling machine 10 (also referred to herein as a baler) configured to receive a bale of compressed material (e.g., from a press 12) and a flexible bag 100. In an embodiment, the baler 10 is configured to receive the compressed bale from the press 12 and cause the compressed bale B to be transferred and inserted into the bag 100. Compressing the bale B includes forming a plurality of grooves or channels G in one or more surfaces S of the bale recessed B from the surface S of the bale B. The bag 100 is flexible and conforms to the shape of the compressed bale B, including the grooves or channels G, as described in further detail below.

Referring now to FIG. 1, the example baling machine (or baler) 10 is configured to receive a bale of compressed material from the press 12. A press 12 includes a receiver 20 having a lower compression platen 22 on which a compressible material, such as cotton, is received. An upper plate or follower block 24 is positioned above the receiver 20. One or both of the follower block 24 and platen 22 can include a plurality of guides or channels 26 therein. In an embodiment, the grooves or channels 26 in the block 24 and platen 22 are parallel to or coincident with one another such that they are aligned with each other. The grooves can be spaced apart from each other, on one of both of the block 24 and platen 22 an equal distance or at predetermined distances from one another that vary along the length of the block 24 or platen. In other words, the distances between grooves along the block and/or the platen can be the same or they can vary. The guides 26 are configured to receive the tines 28 of fork sets 38 that insert above and below the bale B. The press 12 is of a known design. The press 12 includes gates 30 or other personnel protection features to prevent personnel access to the press 12 when in operation.

The baler 10 includes a conveyor or cart 14, a bagger 16 and a control system or controller 18. For purposes of the present disclosure, the relative directions of side-to-side will refer to, for example, movement of the conveyor and/or cart 14 between the press 12 and bagger 16, and the directions of front-to-rear or rear-to-front will refer to, for example, movement of a bale B through the bagger 16.

In the illustrated example, the conveyor 14 is formed as a cart 32 having a load carriage 34 and a mobile base 36. The load carriage 34 includes multiple fork sets 38 mounted parallel to one another along a common shaft 40 that defines an axis $A_{40}$. The fork sets 38 pivot about 180 degrees about the axis $A_{40}$ as a single unit.

The fork sets 38 are spaced from one another a distance to cooperate with the guides 26 in the follower block 24 and platen 22. That is, the fork sets 38 insert into the guides 26 to, as will be described below, provide upper and lower supports as the bale B is removed from the press 12.

A drive assembly 42 is operably connected to the fork sets 38 to rotate the fork sets 38 about the axis $A_{40}$. The drive assembly 42 includes a drive 44, such as a motor, which can drive the fork sets 38 through a chain drive 44 mounted to the shaft 40, as illustrated, a gear drive or the like. The fork sets 38 are mounted to rotate or pivot about the $A_{40}$ axis about 180 degrees to reorient the bale B.

A pusher or transfer plate 50 is mounted to the fork sets 38 and is configured to push a bale B that is positioned in the fork sets 38 out of the fork sets 38. Shafts 52, mounted to plate 50, are mounted for sliding engagement with linear bearings 53, which are mounted to the fork sets 38 to provide smooth, linear movement of the plate 50 and to assure that the plate 50 remains transverse to the fork sets 38 as the bale B is transferred from the fork sets 38. A support bar 54 is also mounted to the plate 50.

The load carriage 34 is mounted to the cart 14 by a pivot shaft 55 and a plurality of springs 56 extend between the load carriage 34 and the cart 14. The pivot shaft 55 allows the load carriage 34 to pivot a short distance side-to-side relative to the cart 14 and the springs 56 maintain the load carriage 34 in a relatively fixed relationship to the cart 14, but allow the load carriage 34 to pivot slightly to adjust any shifting of the bale B within the press 12 and any shifting of the follower block 24 or platen 22 that may occur.

It will be appreciated that because of the extreme force (up to one million pounds) that is exerted on the bale B, the follower block 24 and/or platen 22 may shift slightly. The pivot shaft 55 allows the load carriage 34 to pivot a short distance side-to-side and the springs 56 maintain the load carriage 34 in a relatively fixed relationship to the cart 14, but allow the load carriage 34 to pivot slightly to adjust for shifting of the bale B within the press 12.

The cart 14 is mounted to a track 58 along which it is conveyed between the press 12 and the bagger 16. The track 58 can be as long or as short as necessary to accommodate the footprint in which the system (conveyor/cart system 14 and bagger 16) and the press 12 are located. There are minimum space requirements, insofar as removing or withdrawing the bale B from the press 12 and rotating the load carriage 34 and bale B for introduction to the bagger 16.

A transfer station 66 is formed as part of the conveyor. In a present embodiment, the transfer station 66 includes a drive, such as the illustrated pair of cylinders 68 mounted upstream of the bagger 16 which cooperate with the transfer plate 50 and support bar 54 to ensure proper transfer of the bale B from the load carriage 34 to the bagger 16.

The bagger 16 includes an entrance 70, a discharge station 72, a bag mandrel 74 and may include a back-up assembly 76. The discharge station 72 includes a chute 78 into which the bale B is transferred from the load carriage 34. As such, the entrance 70 opens into a chute 78—the entrance 70 is that side facing the cart load carriage 34—to receive the bale B. The back-up assembly 76, if used, is positioned on a side opposite the entrance 70 and includes a movable wall 80 mounted to the chute 78 by a drive 82, for example, the illustrated plurality of cylinders. The wall 80 moves from the side of the chute 78 to the bale B as the bale B enters the entrance 70, to facilitate transfer of the bale B into the chute 78.

A discharge plate 84 is mounted at a rear of the discharge station 72, rearward of the entrance 70. The discharge plate 84 is driven forwardly into the chute 78 by a drive 86, for example, a cylinder. In a home position, the discharge plate 84 is rearward of the entrance 70 so as to not interfere with movement of the bale B into the chute 78. The cylinder or drive 86 for the discharge plate is a dual-acting drive so that the plate 84 can be returned to the home position following discharge of the bale B. The entrance 70 includes guides 88 that cooperate with the fork sets 38 when transferring a bale B from the load carriage 34 to the bagger 16.

The bag mandrel 74 is positioned at the front of the discharge station 72. A bag, having a sealed end, is positioned over the end of the mandrel 74. In this manner, as the bale B is pushed out of the chute 78, it engages the bag and pulls the bag onto and over the bale B.

The controller 18 includes an operator interface station 94. The controller 18 controls the overall operation of the baler system 10. The controller 18 can also be integrated to include control of the press 12.

In a cycle, material is loaded into the press 12. When the compression or compaction cycle is complete, the platen or lift box 24 (see, FIG. 1), on the press 12 is opened. The cart 14 is moved toward and into the press 12. The fork sets 38, which are in a horizontal orientation, are inserted into the press follower block 24 and platen 22 guides 26 above and below the bale B, respectively. As noted above, in the event that the bale B shifts or that the guides 26 are slightly askew, the pivot shaft 55 and spring 56 mounting of the load carriage 34 to the cart 14 allow the load carriage 34 to pivot slightly side-to-side to align with the guides 26. Moving the cart 14 inward toward, and into engagement with the bale B urges the transfer plate 50 into the apex of the fork sets 38.

Once the cart 14 is properly positioned with the bale B captured within fork sets 38, the fork sets rotational drive 44 can be actuated to rotate the fork sets 38 and the bale B upward or downward at a slight angle to facilitate loosening the bale B from the press 12. Once the bale B is free of the press 12, the cart 14 backs away from the press 12 and begins to move toward the bagger 16. At this time, the fork sets 38 and bale B are pointed generally in the direction of the press 12. The fork sets 38 are then rotated (about 180 degrees). The fork sets 38 can be rotated as the cart 14 is stopped or as the cart 14 is moving toward the bagger 16. In the final orientation, the fork sets 38 and the bale B are reoriented to point toward the bagger 16 with the bale B at about the entrance 70 of the chute 78. In this position, the fork sets 38 are located between the transfer cylinders 68 and the entrance 70, and the support bar 54 is aligned (horizontally) with the transfer cylinders 68.

To accept the bale B, the back-up assembly 76, if used, is extended toward the entrance 70, and the discharge plate 84 is in a retracted or home position. The cart 14 is moved toward the bagger 16 so that the fork sets 38 align and cooperate with the entrance guides 88, and the cart is further moved forward to move the bale B into the entrance 70. When the bale is at the entrance 70, the back-up assembly wall 80 is in contact with the side of the bale B at the entrance. In this manner, the bale B is captured between the transfer plate 50 and the wall 80. The back-up assembly 76, which as noted above may be used, can be used if, for example, there is more fiber on one side of the bale B than on the other side of the bale B. Thus, when the bale B is captured between the transfer plate 50 and the back-up assembly 76, the back-up assembly 76 supports bale B transfer from the fork sets 38 and also prevents loosening of the bale (e.g., the bale B is retained in the compressed state).

The transfer cylinders 68 are then actuated which pushes the transfer plate 50, which in turn pushes the bale B in a transfer direction from the fork sets 38 into the entrance 70. It will be appreciated that the shafts 52 maintain the plate 50 flat against the side of the bale B, and do not allow the plate to skew, as the bale B is pushed into the entrance 70. Pushing the bale B into the entrance 70 also pushes the wall 80 back to a retracted position.

Once the bale B is in the chute 78, the discharge plate cylinder 86 is actuated to push the bale B from the entrance 70 along or through the chute 78 toward the bag mandrel 74 in a bagging or containerizing direction. The bagging direction is transverse to the transfer direction.

It is contemplated that a bale B will be present in the discharge end 90 of the chute 78 as a subsequent bale is introduced into the entrance 70. As the bale B in entrance 70 is urged toward the discharge end 90, the prior bale (in the discharge end 90) is forced out through the mandrel 74 and is captured in a bag 100 at the final discharge 92.

The bag 100 is flexible and conforms to the shape of the compressed bale B. In various embodiments, the bag 100 is made of a suitable high strength material or combination of materials such as polyethylene terephthalate (PET), polypropylene, polyethylene, or the like. It is anticipated that bags 100 can be manufactured from recycled materials, for example, recycled PET, which provides the necessary strength. In an embodiment, the bag 100 is formed by weaving or looming the polymeric strands or tapes to form the woven material. In an embodiment, a bag 100 may be formed from a material of woven strands or tapes of polyethylene terephthalate (PET). Those skilled in the art will recognize that such a woven material can be formed from any suitable material and, if woven from tapes, may be formed having any suitable tape density. In various embodiments, the bag 100 of the present disclosure may include one or more ventilation holes or openings 110 to permit ventilation for the compressed load to, for example, reduce condensation in the wrapped load and to permit air circulation around the load. In an alternate embodiment as shown in FIGS. 18*a*-18*c*, the bag can include reinforced regions formed by increased tape densities as illustrated at 104.

An end of the bag may include a seal 103. In one example embodiment, as shown in FIG. 16, the bag 100 has an overall length $l_{100}$ of about 87 inches, a usable length $l_{106}$ of about 86 inches (one inch is reserved for the end seal 103), and is about 24.5 inches in height $h_{100}$ and depth.

When the bale B is introduced into the bag 100, the bale B will expand. The areas of the bale B adjacent to the channels or grooves will expand outwardly, as will the areas within the grooves G. However, the areas within the grooves G will not expand to the same extent as those areas S adjacent to the grooves G. As such, the grooves G will be recessed from the surface S of the bale B.

The bag 100 conforms to the shape of the bale B such that the regions of the bag that conform to the grooves G will also be recessed from the surface S of the bale B. Accordingly, if grooves G are formed in one side of the bale B, then the bag 100 will conform to the grooves G in that side. Likewise, if grooves G are formed in two sides of the bale B (e.g., in the top and bottom of the bale), then the bag 100 will conform to the grooves G in the two sides of the bale B. In this manner, the portions of the bag 100 overlying any face or side of the bagged bale B that is facing or resting on the ground (or floor) has portions that do not make contact with the ground. Thus, even if the bag 100 on the surface of the bale B is abraded or torn, the regions of the bag within the grooves G will maintain the bale B in a compressed state and will maintain the integrity of the bale. For example, if the parts of the bag 100 that contact the ground are damaged (such as when the bale B is moved around the floor of a warehouse, or loaded and unloaded from a truck and the face of the bag 100 is abraded), the recessed portions of the bag 100 which conform to the channels or grooves G may remain intact to maintain the bale in a compressed and contained state.

As noted above, the channels or grooves 26 in the upper plate 24 and lower platen 22 can be parallel to or aligned with one another. As such, the grooves in the bale, for example, at the top and bottom of the bale as it sits in the press 12, will be aligned with one another. This results in the recessed portions of the bag that reside in the grooves also being aligned with one another on opposites faces of the bale. Thus, the recessed portions of the bag that surround the bale will be perpendicular to a longitudinal axis $A_B$ of the bale B, and thus formed at their shortest length around the bale, maintaining tight compression of the bale without the tendency for the recessed bag portions to slip or shift and thus permit the bale to loosen.

As noted above, the baling system and method enables compressing and containing, and protecting, a compressible material such as cotton, without the need for straps, wires or the like. In an embodiment, the method includes receiving a quantity of compressed material, compressing the material into a bale and introducing the bale of compressed material, without straps or wires, into a container, such as a bag, in the compressed state. In an embodiment, compressing the bale includes forming a plurality of grooves or channels in one or more sides of the bale. In an embodiment, the grooves or channels can be aligned with one another on opposite side or faces of the bale. The compressed bale is positioned within a conforming bag that can be closed or sealed onto itself, as at 112, to form a packaged bale for subsequent handling. The bag conforms to the grooves in the bale, recessed from a surface of the bale. Because the groove-conforming portions of the bag are also aligned with one another they surround the bale in the shortest possible distance around the bale, thus maintaining compression on the bale and reducing the possibility that the groove-conforming portions will slip or shift loosening the bale.

In an embodiment, the method includes compressing the bale of material at a location (a compressing location) and transferring the compressed bale, in a transfer direction to a different location (a bagging or containerizing) location for bagging. In some embodiments, while being transferred to the bagging location, the bale is retained in the compressed state. Bagging or containerizing may be carried out in a different direction (a bagging or containerizing direction) different from (e.g., transverse to) the transfer direction.

In an embodiment, the method can include receiving the bale of compressed material in a conveyor having a mobile portion and a load carriage. The load carriage is movably mounted to the mobile portion and includes a region for receiving the bale of compressed material. The load carriage includes multiple tines configured for supporting the bale of compressed material, the tines engaging the bale at at least some of the recessed regions.

The method can include transferring the bale into a bagger including a chute having an entrance and a discharge. The discharge has a bagging mandrel. The bagger is configured to receive the bale and move the bale from the entrance to the discharge and the bagging mandrel. The method can further include introducing the bale into the bag. The bag conforms to the shape of the bale so that at least portions of the bag conform to the grooves formed in the bale, recessed from an outermost surface of the bale.

It should be appreciated that the present baling system and method enables high pressure compaction of compressible material, conveyance and packaging (e.g., bagging) without the need for applying strapping or wire (or other similar structures) to or on the bale.

Although the various drives are described as motors, chain drives, cylinders and the like, it is to be understood that any type of suitable drive other than those described can be used in most if not all of the disclosed assemblies and that all such drives fall within the scope of the present disclosure.

It will also be appreciated by those skilled in the art that the relative directional terms such as sides, upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A method for containing a bale of compressible material without straps or wires, the method comprising:
   compressing the bale of compressible material to form a compressed bale having a plurality of grooves in at least one side thereof, the grooves being recessed from an outer surface of the compressed bale; and
   transferring the compressed bale to a flexible container, the compressed bale maintaining at least some of the grooves therein, the container conforming to a shape of the compressed bale such that at least some portions of the flexible container conform to the grooves to define container portions recessed from the outer surface of the compressed bale.

2. The method of claim 1 wherein the grooves are formed in two sides of the compressed bale.

3. The method of claim 2 wherein the two sides are opposite one another.

4. The method of claim 3 wherein the grooves in the two sides opposite one another are aligned with one another and wherein the portions of the container conforming to the grooves surround the bale at a least possible distance around the bale.

5. The method of claim 1 including forming the grooves in the compressed bale equally spaced apart from one another.

6. The method of claim 1 wherein the flexible container is a bag, and wherein the bag is formed from a woven material.

7. The method of claim 6 wherein the woven material is a woven polymeric material.

8. The method of claim 7 wherein the material is a woven PET material.

9. A method for containing a bale of compressible material without straps or wires, the method comprising:
   forming a grooved compressed bale of compressible material, the grooved compressed bale having grooves in at least one side thereof, the grooves being recessed from an outer surface of the compressed bale; and
   introducing the compressed bale into a flexible container such that at least a portion of the flexible container conforms to the grooves and is recessed from the outer surface of the compressed bale, the grooves extending around the bale in a direction perpendicular to a longitudinal axis of the bale.

10. The method of claim 9 wherein the grooves are formed in two opposite sides of the compressed bale aligned with one another relative to the longitudinal axis.

11. The method of claim 9 including forming the grooves in the compressed bale equally spaced apart from one another.

12. The method of claim 9 wherein the flexible container is a bag, and wherein the bag is formed from a woven material.

13. The method of claim 12 wherein the woven material is a woven polymeric material.

14. The method of claim 13 wherein the woven polymeric material is a woven material.

15. A containerized bale of compressible material secured without straps or wires, formed by the method comprising:
   compressing the bale of compressible material to form a compressed bale having a plurality of grooves in at least one side thereof, the grooves being recessed from an outer surface of the compressed bale; and
   transferring the compressed bale to a flexible container, the compressed bale maintaining at least some of the grooves therein, the container conforming to a shape of the compressed bale such that at least some portions of the flexible container conform to the grooves to define container portions recessed from the outer surface of the compressed bale.

16. The containerized bale of claim 15 wherein the grooves are formed in two sides of the compressed bale.

17. The containerized bale of claim 16 wherein the two sides are opposite one another.

18. The containerized bale of claim 17 wherein the grooves in the two sides opposite one another are aligned with one another and wherein the portions of the container conforming to the grooves surround the bale at a least possible distance around the bale.

19. The containerized bale of claim 15 including forming the grooves in the compressed bale equally spaced apart from one another.

20. The containerized bale of claim 15 wherein the flexible container is a bag, and wherein the bag is formed from a woven material.

21. The containerized bale of claim 20 wherein the woven material is a woven polymeric material.

22. The containerized bale of claim 21 wherein the material is a woven PET material.

* * * * *